Aug. 13, 1940.  A. J. WEATHERHEAD, JR  2,210,993
METHOD OF MAKING WORK HOLDING DEVICE
Filed Feb. 12, 1938    2 Sheets-Sheet 1
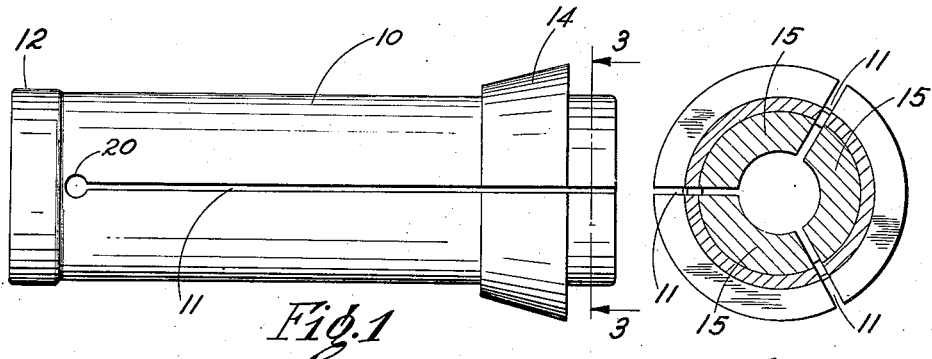
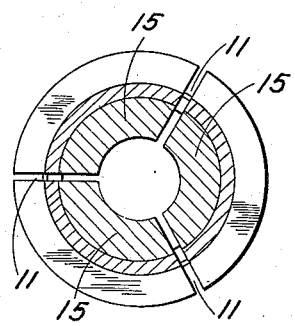
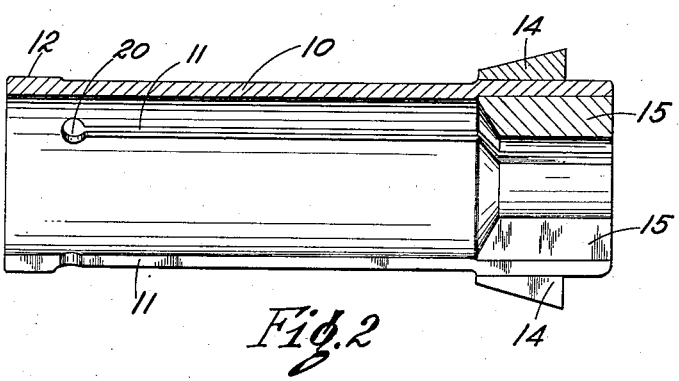
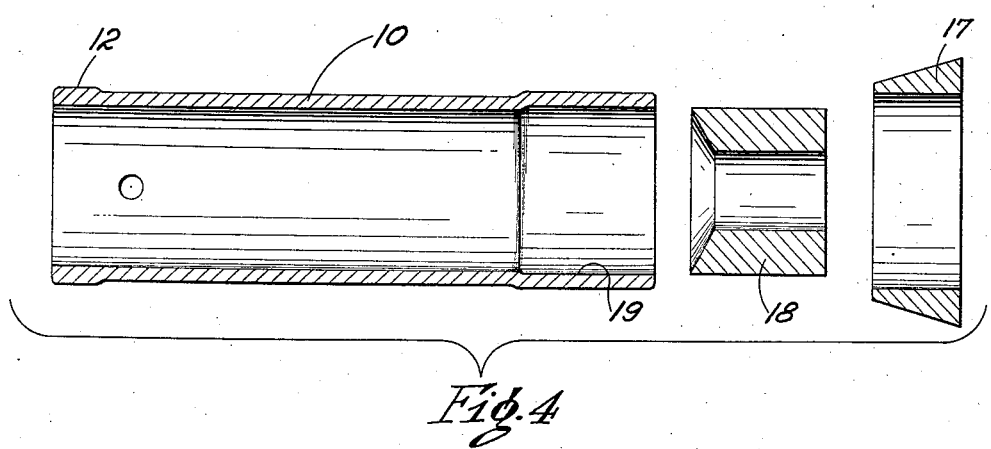
INVENTOR.
ALBERT J. WEATHERHEAD, JR.
BY
Richey & Watts
ATTORNEYS Aug. 13, 1940.    A. J. WEATHERHEAD, JR    2,210,993
METHOD OF MAKING WORK HOLDING DEVICE
Filed Feb. 12, 1938    2 Sheets-Sheet 2
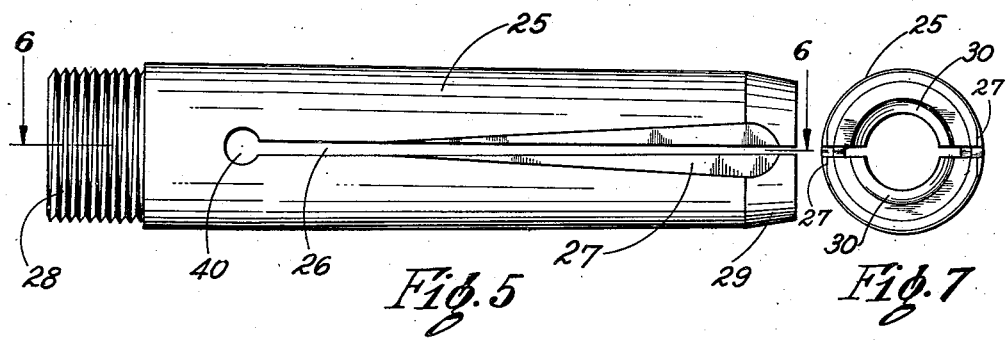
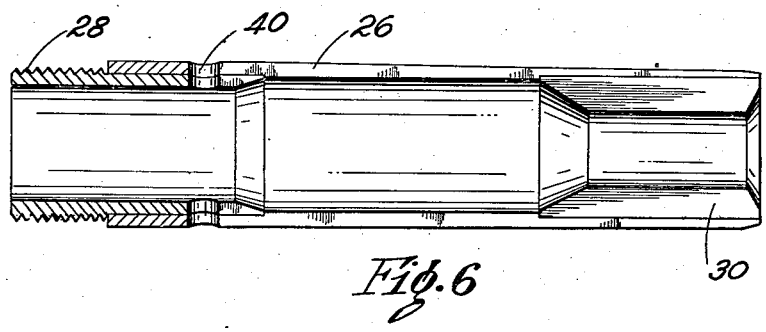
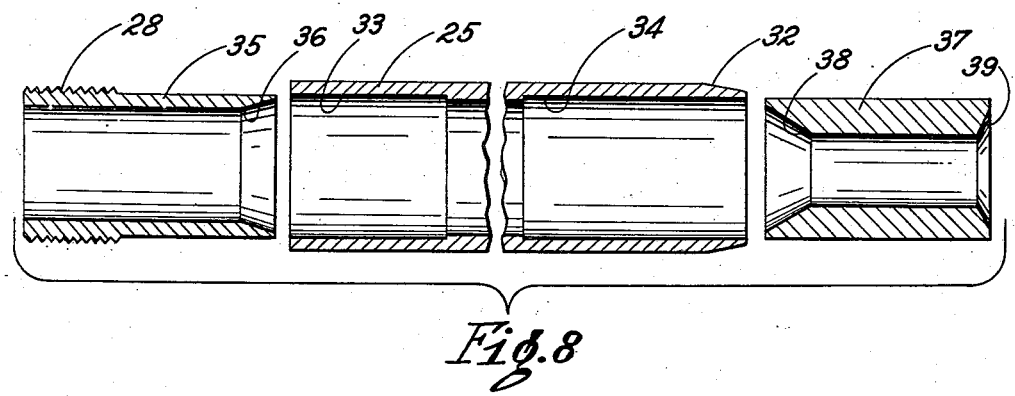
INVENTOR.
ALBERT J. WEATHERHEAD, JR.
BY
Richey & Watts
ATTORNEYS Patented Aug. 13, 1940

2,210,993

UNITED STATES PATENT OFFICE 2,210,993

METHOD OF MAKING WORK HOLDING DEVICES

Albert J. Weatherhead, Jr., Cleveland, Ohio, assignor to The Weatherhead Company, Cleveland, Ohio, a corporation of Ohio Application February 12, 1938, Serial No. 190,269

2 Claims. (Cl. 29—156)

This invention relates to work holding and advancing devices and methods of making the same and the invention is described herein as applied to collets and feed fingers such as are employed in automatic screw machines for holding and advancing the stock.

Devices of this sort must be made accurately in order to properly center the rotating bar in the spindle of the machine and they are subject to severe wear because of their frictional engagement with the bar stock, and with camming or wedging devices in the spindles of the machines. Thus the stock gripping surfaces, as well as the surfaces which are engaged by cams, must be made of hard, durable, wear resisting material.

Heretofore it has been the practice to make such devices by machining them out of bars of tool steel. By this method, a great deal of expensive tool steel is wasted and a great many difficult machining operations must be carried out. Furthermore, while tool steel is the correct material for the surfaces of the devices which are subject to frictional wear, other materials are more desirable for the resilient body portions of the devices.

According to my invention, I preferably manufacture such work holding devices by an economical method which comprises forming the relatively small wearing surfaces of tool steel and employing seamless tubing of the proper carbon content for the body portions of the devices. The various parts going to make up the collet or feed finger, as the case may be, are then permanently joined preferably by copper brazing in a reducing atmosphere and the finish machining operations carried out, after which the assembly is heat treated to harden the tool steel wearing surfaces and to temper the seamless tubing comprising the body or sleeve of the collet to give it the proper degree of resilience.

By this method, I am able to produce durable, long lived collets and feed fingers having very desirable operating characteristics at a fraction of the cost of prior devices made by conventional methods. Other advantages of my invention will become apparent from the following description of preferred forms thereof, reference being made to the accompanying drawings in which Figure 1 illustrates a collet made according to my invention; Figure 2 is a longitudinal section through the collet shown in Figure 1; Figure 3 is a transverse section taken along the line 3—3 of Figure 1; Figure 4 illustrates the component parts of the collet of Figure 1; Figure 5 is an elevation of a feed finger made according to my invention and adapted for use with the collet shown in Figure 1; Figure 6 is a longitudinal section through the feed finger shown in Figure 5, as indicated by the line 6—6 on Figure 5; Figure 7 is an end view of the feed finger shown in Figure 5; and, Figure 8 shows the parts making up the feed finger illustrated in Figure 5.

Referring to Figures 1 to 4, inclusive, one type of collet made according to my invention may comprise a sleeve or body 10 having a plurality of slots 11 which make the sleeve resilient and having at one end a guiding surface 12 which is adapted to fit within a tube in the spindle of an automatic screw machine and which may be of slightly larger diameter than the remainder of the sleeve. At its other end the sleeve is provided with an exterior conical wedging surface 14 which is adapted to be engaged by a corresponding wedging surface in the spindle of the screw machine to contract the collet to cause the internal gripping surfaces or jaws 15 to firmly grip the bar of stock which is being operated upon by the machine. The gripping jaws shown are adapted to engage a round rod or bar. Obviously, the shape of the jaws may be varied depending upon the cross section of the stock.

As noted above, devices of this sort heretofore have been made from a solid piece of tool steel, and it will be evident from the drawings that in the manufacture of a collet from a bar of tool steel a great deal of difficult machining is required and more than half of the material must be cut away. Furthermore, the only surfaces which are subject to any great degree of wear are the wedging surfaces 14 and the surfaces of the gripping fingers 15. The main body of the collet is not subject to wear but must be resilient to allow the gripping fingers 15 to be moved into and out of engagement with the bar stock during the operation of the machine.

Accordingly, I preferably form my collets of three separate pieces permanently joined together by copper brazing in a furnace having a reducing atmosphere. The body 10 of the collet as shown in Figure 4 comprises merely a piece of seamless tubing having a sufficiently high carbon content to enable it to be satisfactorily hardened and to have a sufficient degree of resilience. I have found S. A. E. 4160 steel to be satisfactory for this purpose. The body portion is made merely by cutting seamless tubing to the desired length, then machining the exterior to reduce the external diameter slightly to produce the desired wall thickness throughout the body portion of the collet. The wall thickness is reduced only for the purpose of increasing the flexibility of the collet, and for some types of collets no external machining will be required.

The wedging surfaces 14 and gripping fingers 15 are formed from tool steel rings 17 and 18, respectively. These parts may be readily machined from bars of tool steel with little waste as compared to the waste which occurs in machining the entire collet from tool steel. The internal diameter of the ring 17 is dimensioned to make a press fit with the exterior of the end of the tube 10, while the external diameter of the ring 18 is similarly arranged for a press fit within the counter bored portion 19 of the tube 10.

The rings 17 and 18 are assembled with the sleeve or tube 10. Copper is suitably supplied to the contacting surfaces of the parts, for example by rings of copper wire disposed adjacent the joints or by copper plating one or both of the contacting surfaces, and the assembly is then placed in a brazing furnace having a controlled reducing atmosphere. The temperature of the parts is raised to about 2200° F., at which temperature the copper becomes fluid and in the reducing atmosphere of the furnace alloys with the underlying material to form a very strong and durable joint between the parts. After the brazing is completed, the assembled parts are allowed to cool slowly, leaving the material in a fairly soft or annealed condition. Thereafter the slots 11 are sawed or milled and the holes 20 drilled, whereupon the collet is ready for heat treatment.

The assembled collet is then given the desired heat treatment to harden the tool steel wedging surfaces and gripping jaws and to give the required degree of resilience or springiness to the tube. During the heat treatment operation and while the metal is hot, the gaps formed by the slots 11 are sprung open to give a permanent set to the material with the gap of the proper width to give the collet a natural tendency to spring away from the work to release the work from the grip of the jaws 15.

I have found that collets of this character can be manufactured at a fraction of the cost of collets manufactured from bars of tool steel and that my collets are durable and give longer and more satisfactory service than prior types of collets. It will be evident that my invention can be applied to other work holding devices, for example the feed finger illustrated in Figures 5 to 8, inclusive.

As shown in the drawings, the feed finger preferably comprises a tubular member 25 slightly tapered from left to right as shown in the drawings and provided with slots 26 and ground flat portions 27. The end of the tubular member 25 is provided with a threaded connector 28 which engages a part of the spindle of the automatic screw machine, while at the opposite end the tapered surface 29 is formed, which engages within the collet illustrated in Figures 1 to 4 of the drawings. The inner structure of the feed finger, as illustrated in Figure 6, includes gripping pads 30 which engage and grip the stock to feed it forward through the spindle of the machine and through the jaws of the collet which acts in conjunction with the feed finger.

Heretofore devices of this sort, like the collet previously described, have been made by expensive and difficult machining operations carried out on relatively large pieces of tool steel. By my invention however, the devices can be made economically and advantageously from seamless tubing and a small amount of tool steel utilized for the gripping pads. As shown particularly in Figure 8, the main body portion 25 of the collet may be formed from a single piece of seamless tubing, preferably having a sufficiently high carbon content to give the necessary resilience such as S. A. E. 4160 steel. The exterior of the tubing requires no machining except the slight taper or bevel 32 on one end thereof, and the interior only requires the machining of the counterbored portions 33 and 34 which are merely utilized to position the other parts of the feed finger and which may be eliminated if desired.

The threaded end portion is likewise made from seamless tubing and is provided with the threaded portion 28 and a cylindrical portion 35 which makes a pressed fit within the counterbored portion 33 of the tube 25. If desired, the inner end of the connector portion may be beveled or chamfered as at 36. As this part does not need to be resilient and as it is subjected to little wear, it may be made of any ordinary seamless tubing. I have found, for instance, that S. A. E. 1030 steel is very satisfactory.

The gripping fingers are formed from a ring 37 of tool steel having an exterior diameter dimensioned to make a pressed fit within the counterbored portion 34 of the body 25 and having the opposite ends thereof provided with beveled or conical surfaces 38 and 39.

The various parts are assembled as described in connection with the collet and subjected to the copper brazing operation to make a unitary structure. Thereafter the holes 40 are drilled and the slots 26 are sawed or milled in the tubing body 25 and the ring 37, thus producing the separate gripping fingers 30.

To produce the taper on the exterior of the body portion 25, I preferably deform the body portion by squeezing the slots together during the heat treatment operation which is carried out, after machining, to impart the desired hardness and resilience to the gripping pads and body portion, respectively. This, of course, produces a taper only in one plane and in order to have the feed finger tapered in two planes for easy entrance into the collet, the flats 27 are ground in planes at right angles to the plane of the slots 26.

From the foregoing description of preferred forms of my invention, it will be seen that I have provided work holding devices such as collets and feed fingers in which the various parts are made of the materials best suited for their functions, and which are permanently joined together to form a strong, unitary structure. It will be obvious that such devices can be manufactured by my method at greatly reduced cost as compared to prior methods of making such devices from single pieces of expensive tool steel. I find that by employing the materials and by following the procedure described there is substantially no warpage during the brazing operation and during the subsequent heat treatment, so that the parts have the necessary accuracy to insure the production of accurate work by the machine in which they are employed.

Furthermore devices made according to my invention are longer lived than prior types of collets or feed fingers. Such devices when made by machining from a single piece of bar stock frequently fail, long before the wearing surfaces are badly worn, by breaking due to fatigue of the metal where it is subject to repeated flexing, as at the base of the longitudinal slots between the drilled holes at the ends of the slots. Devices made according to my invention have much greater resistance to fatigue for various reasons, some of which are as follows:

(1) In devices made from bar stock, the material must be selected for resilience and resistance to fatigue as well as for wear resisting qualities. Thus a compromise must be made in the selection of the material, and the alloys employed do not have the great resistance to fatigue of the seamless tubing which I preferably employ.

(2) Devices made from bar stock require a great deal of machining. Generally the finished devices have tool marks or scratches in the regions of greatest stress which operate further to concentrate the stresses and thus hasten the failure of the devices by fatigue. Devices made according to my invention, on the other hand, require little machining and are thus practically free from tool marks. For example, the device shown in Figures 1 to 4, inclusive, requires no internal machining in the region adjacent the ends of the slots, while the device shown in Figures 5 to 8, inclusive, requires no external machining in that region and it is further reinforced internally by the connector portion 35 which is brazed thereto.

(3) Seamless tubing, due to the methods employed in its manufacture, must be made of high grade metal to start with, and further the character of the metal is improved during the manufacturing operations because of the great amount of working to which it is subjected. Thus the metal of the tubing is homogenous throughout and has a better structure than the bar stock employed in prior methods of making collets.

I have disclosed herein the application of my invention to two different types of collets or work feeding devices. It will be obvious to those skilled in the art that my invention has other applications and that my method may be used in the manufacture of other such devices all without departing from the teachings of my invention. It is therefore to be understood that my patent is not limited to the specific embodiments thereof described herein or in any manner other than by the appended claims.

I claim:

1. A method of making a work holding device having a resilient tubular body portion, internal work engaging jaws and exterior wedging surfaces at one end of said body portion, which includes the steps of cutting steel tubing to length to form the body portion, forming rings of hard, wear resisting ferrous material adapted to fit the interior and exterior respectively of one end of said body portion, copper brazing said rings to said body portion, cutting longitudinally extending slots through said rings and along said body portion to provide resiliently supported segmental work engaging jaws and wedging surfaces, said slots terminating short of the end of said body portion opposite said jaws, and thereafter heat treating the assembly and springing open the slots during the heat treating operation.

2. A method of making a work holding device having a resilient tubular body portion, a threaded end portion and internal work engaging jaws at the end of said body portion opposite the threaded end thereof which includes the steps of cutting seamless steel tubing to length to form the body portion, forming said threaded end from another piece of seamless steel tubing adapted to fit within one end of said body portion, forming a ring of hard, wear resisting ferrous material adapted to fit within the other end of said body portion, copper brazing said threaded end portion and said ring to said body portion, cutting longitudinally extending slots through said ring and along said body portion to provide segmental work engaging jaws, said slots terminating short of said threaded end portion, and thereafter subjecting the assembly to heat treatment and during the heat treatment squeezing said jaws toward each other and narrowing the open ends of said slots.

ALBERT J. WEATHERHEAD, Jr.